(12) United States Patent
Kuo et al.

(10) Patent No.: US 12,306,436 B2
(45) Date of Patent: *May 20, 2025

(54) THERMALLY TUNABLE WAVEGUIDE AND PHOTONIC INTEGRATED CIRCUIT COMPONENT HAVING THE SAME

(71) Applicant: Taiwan Semiconductor Manufacturing Company, Ltd., Hsinchu (TW)

(72) Inventors: Feng-Wei Kuo, Hsinchu County (TW); Wen-Shiang Liao, Miaoli County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,948

(22) Filed: Mar. 7, 2024

(65) Prior Publication Data

US 2024/0210617 A1    Jun. 27, 2024

Related U.S. Application Data

(63) Continuation of application No. 17/573,623, filed on Jan. 11, 2022, now Pat. No. 11,953,723.

(51) Int. Cl.
*G02B 6/12*     (2006.01)
*G02B 6/293*    (2006.01)

(52) U.S. Cl.
CPC ............... *G02B 6/12007* (2013.01); *G02B 2006/12142* (2013.01); *G02B 6/29338* (2013.01); *G02B 6/29352* (2013.01); *G02B 6/29395* (2013.01)

(58) Field of Classification Search
CPC ............ G02B 6/12007; G02B 6/29338; G02B 6/29352; G02B 6/29395; G02B 2006/12142
USPC ........................................................ 385/14
See application file for complete search history.

(56) References Cited

U.S. PATENT DOCUMENTS 6,324,204 B1 * 11/2001 Deacon ................... H01S 5/141
                                                        372/20
11,953,723 B2 * 4/2024 Kuo ....................... G02F 1/0147

* cited by examiner

*Primary Examiner* — Jerry M Blevins
(74) *Attorney, Agent, or Firm* — JCIPRNET

(57) ABSTRACT

A thermally tunable waveguide including an optical waveguide and a heater is provided. The optical waveguide includes a phase shifter. The heater is disposed over the optical waveguide. The heater includes a heating portion, pad portions and tapered portions. The heating portion overlaps with the phase shifter of the optical waveguide. The pad portions are disposed aside of the heating portion. Each of the pad portions is connected to the heating portion through one of the tapered portions respectively.

20 Claims, 7 Drawing Sheets

THERMALLY TUNABLE WAVEGUIDE AND PHOTONIC INTEGRATED CIRCUIT COMPONENT HAVING THE SAME

CROSS-REFERENCE TO RELATED APPLICATION

This application is a continuation application of and claims the priority benefit of a prior application Ser. No. 17/573,623, filed on Jan. 11, 2022 and now allowed. The entirety of the above-mentioned patent applications is hereby incorporated by reference herein and made a part of this specification.

BACKGROUND

Silicon photonic technologies are emerging as important roles for high-speed optical data communication. For instance, optical transceiver modules including high-speed phase modulators, grating couplers and waveguides are used in high-speed optical communication systems. High-speed and low-power reconfigurable photonic devices formed in photonic integrated circuit (PIC) components, such as thermally tunable waveguides, are needed for high throughput in optical communication networks. Performance of the thermally tunable waveguides is required to be improved in this field.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
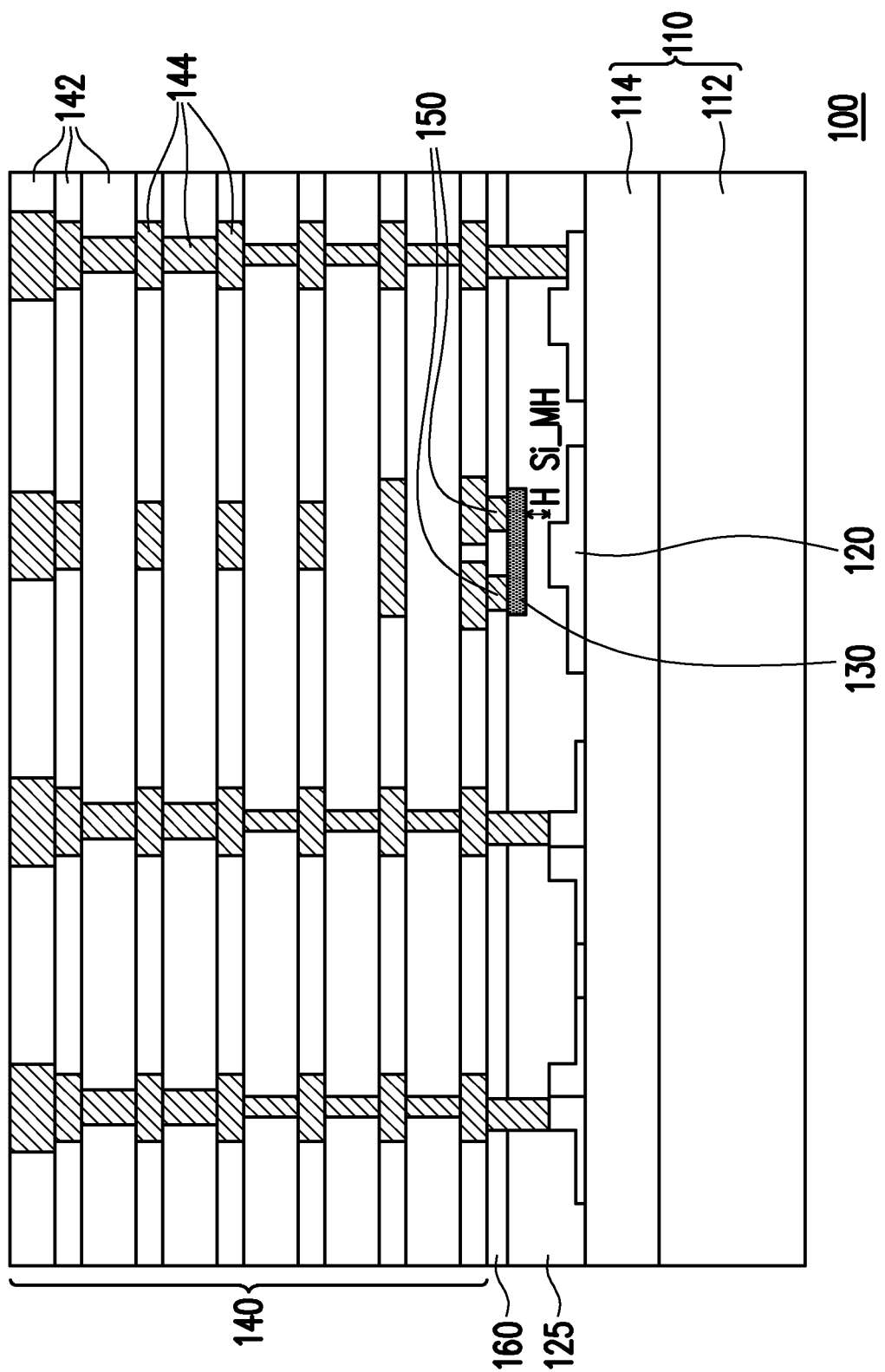
FIG. 1 is a cross-sectional view schematically illustrating a photonic integrated circuit component in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Silicon photonics can potentially achieve lower energy and higher bandwidth density over electrical I/O. Additionally, optical links benefit from distance insensitivity due to the inherently low loss of fibers, allowing for new types of connectivity and network organization in modern digital systems and data-centers. Wavelength-division multiplexing (WDM) may also be realized to place many data channels on a single optical fiber, thereby increasing the bandwidth density while retaining energy efficiency and breaking the I/O pin limitations imposed by the electronics. Compared with general optical interconnects, silicon photonic interconnects reduce manufacturing cost dramatically as the modulators and photodetectors are fabricated on standard silicon wafers instead of very expensive III-V wafers. In addition, silicon photonics are generally compatible with CMOS processes, enabling large-scale integration between CMOS circuits and photonic devices, such as monolithic integration and 3D integration. Silicon photonic interconnects achieve high bandwidth density and high energy efficiency through close electronic-photonic integration.

FIG. 1 is a cross-sectional view schematically illustrating a photonic integrated circuit component in accordance with some embodiments of the present disclosure.

Referring to FIG. 1, a photonic integrated circuit component 100 in accordance with some embodiments of the present disclosure may include a semiconductor substrate 110, an optical waveguide 120, a heater 130, and an interconnect structure 140. In some embodiments, the semiconductor substrate 110 includes a bulk substrate 112 covered by a buried insulating layer 114, wherein the semiconductor substrate 112 is a silicon bulk substrate including active components (e.g., transistors or the like) and passive components (e.g., resistors, capacitors, inductors, or the like) formed through front end of line (FEOL) processes, and the buried insulating layer 114 includes a silicon oxide layer, a silicon nitride layer, or a silicon oxynitride layer. The semiconductor substrate 110 may be a silicon-on-insulator (SOI) substrate. The semiconductor substrate 110 may include various doped regions depending on design requirements (e.g., p-type substrate or n-type substrate). In some embodiments, the doped regions may be doped with p-type or n-type dopants. The doped regions may be doped with p-type dopants, such as boron or BF2; n-type dopants, such as phosphorus or arsenic; and/or combinations thereof. The doped regions may be configured for n-type Fin-type Field Effect Transistors (FinFETs) and/or p-type FinFETs. In some alternative embodiments, the semiconductor substrate 110 is made of some other suitable elemental semiconductor, such as diamond or germanium; a suitable compound semiconductor, such as gallium arsenide, silicon carbide, indium arsenide, or indium phosphide; or a suitable alloy semiconductor, such as silicon germanium carbide, gallium arsenic phosphide, or gallium indium phosphide.

The optical waveguide 120 is disposed over the semiconductor substrate 110. For example, the optical waveguide 120 is disposed on the buried insulating layer 114 formed on the bulk substrate 112 of the semiconductor substrate 110. The heater 130 is disposed above the optical waveguide 120, and the heater 130 partially overlaps with the optical waveguide 120. In some embodiments, the heater 130 is spaced apart from the optical waveguide 120 through an interlayer dielectric layer 125 formed on the buried insulating layer 114. The above-mentioned optical waveguide 120 and heater 130 are formed through front end of line (FEOL) processes. The heater 130 and the optical waveguide 120 are embedded in the interlayer dielectric layer 125. The interlayer dielectric layer 125 may be a silicon oxide layer, a silicon nitride layer, a silicon oxy-nitride layer, or a dielectric layer formed by other suitable dielectric materials. In some embodiments, a distance $H_{Si-MH}$ is between the heater 130 and the optical waveguide 120 ranges from about 320 nanometers to about 3180 nanometers. In some embodiments, the resistance of the heater 130 is about 30 ohm per square. In some embodiments, the material of the heater 130 includes aluminum (Al), copper (Cu), ruthenium (Ru), manganese (Mn), titanium (Ti), titanium nitride (TiN) or silicon nitride (SiN). The detailed designs of the optical waveguide 120 and the heater 130 are described in accompany with FIGS. 2 through 7.

An interlayer dielectric layer 160 is formed over the interlayer dielectric layer 125 to cover the heater 130. The interlayer dielectric layer 160 may be a silicon oxide layer, a silicon nitride layer, a silicon oxy-nitride layer, or a dielectric layer formed by other suitable dielectric materials. In some embodiments, the material of the interlayer dielectric layer 160 is the same as that of the interlayer dielectric layer 125. In some other embodiments, the material of the interlayer dielectric layer 160 is different from that of the interlayer dielectric layer 125.

Conductive contacts 150 which are electrically connected to the heater 130 are formed in the interlayer dielectric layer 160. The conductive contacts 150 land on and are electrically connected to pad portions of the heater 130. The conductive contacts 150 may be metal contacts. The conductive contacts 150, the interlayer dielectric layer 125 and the interlayer dielectric layer 160 are formed through middle end of line (MEOL) processes.

The interconnect structure 140 is disposed on the interlayer dielectric layer 160 and the conductive contacts 150. In other words, the interconnect structure 140 is disposed over the optical waveguide 120 and the heater 130, and the heater 130 is between the interconnect structure 140 and the optical waveguide 120. The interconnect structure 140 is electrically connected to the heater 130 through the conductive contacts 150 formed in the interlayer dielectric layer 160. The interconnect structure 140 is electrically connected to the active components (e.g., transistors or the like) and passive components (e.g., resistors, capacitors, inductors, or the like) formed in the semiconductor substrate 110 through other conductors (e.g., conductive vias formed in the interlayer dielectric layers 125 and 160). The interconnect structure 140 may include inter-dielectric layers 142 and interconnect wirings 144 stacked alternately. The inter-dielectric layers 142 may be silicon oxide layers, silicon nitride layers, silicon oxy-nitride layers, or dielectric layers formed by other suitable dielectric materials, and the interconnect wirings 144 may be patterned copper layers or other suitable patterned metal layers. The inter-dielectric layers 142 and the interconnect wirings 144 may be formed through back end of line (BEOL) processes.

FIGS. 2, FIGS. 4-5 and FIG. 6 are schematic top views illustrating thermally tunable waveguides in accordance with various embodiments of the present disclosure. FIG. 3 and FIG. 7 are top views schematically illustrating the heater of the thermally tunable waveguide.

Figure 2:
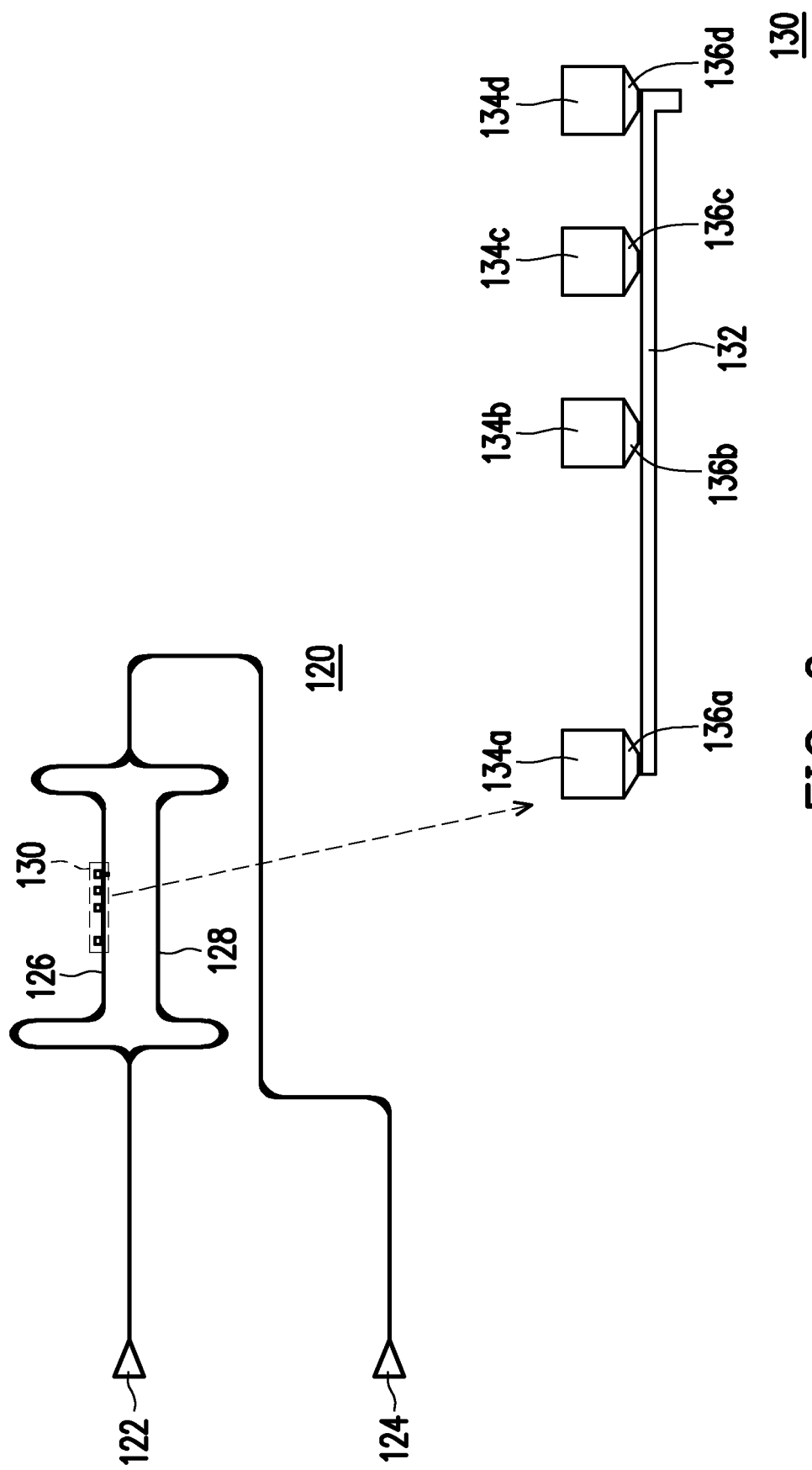
FIGS. 2, FIGS. 4-5 and FIG. 6 are schematic top views illustrating thermally tunable waveguides in accordance with various embodiments of the present disclosure.
Figure 3:
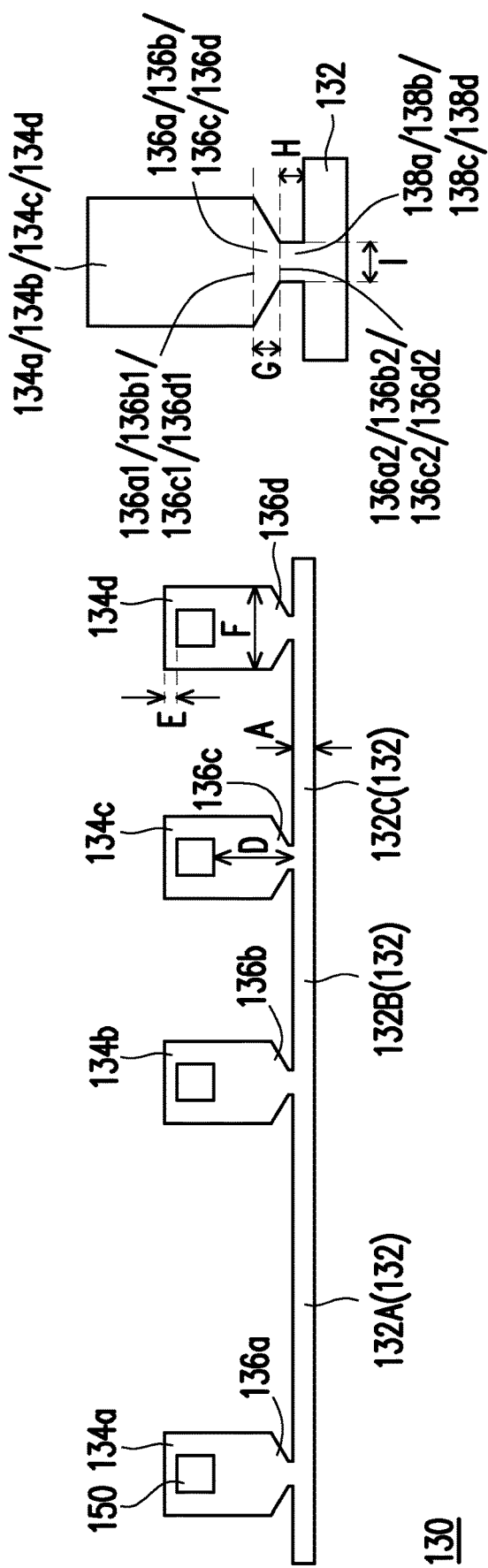
FIG. 3 and FIG. 7 are top views schematically illustrating the heater of the thermally tunable waveguide.

Referring to FIG. 2, the optical waveguide 120 includes a Mach-Zehnder Modulator (MZM). The Mach-Zehnder Modulator includes an optical input end 122, an optical output end 124, a first modulator arm 126 and a second modulator arm 128, wherein an optical signal propagated from the optical input end 122 to the optical output end 124 is split into the first modulator arm 126 and the second modulator arm 128 and recombined at the optical output end 124. As illustrated in FIG. 2, in some embodiments, the first modulator arm 126 includes a PN junction-based phase shifter, and a heating portion 132 of the heater 130 overlaps with the first modulator arm 126. For example, the PN junction-based phase shifter in the first modulator arm 126 includes an interleaved PN junction, a lateral PN junction, or a vertical PN junction. High-speed phase modulation may be achieved with depletion-mode PN junctions. Within PN junctions, the number of excess electrons and holes strongly dictate the refractive index and absorption coefficient. Combined with the applied voltage across the junction, these factors affect the maximum phase shift as well as the loss. Device parameters for phase shifters include intrinsic index and absorption, junction geometries and doping concentrations. Furthermore, the heating portion 132 of the heater 130 does not overlap with the second modulator arm 128. The heater 130 heats the first modulator arm 126 such that phase of the optical signal propagated in the first modulator arm 126 may modulated. Large wavelength/phase shift (e.g., about 10 nm wavelength/phase shift) can be obtained.

As illustrated in FIG. 2 and FIG. 3, the heater 130 includes a heating portion 132 (e.g., a heating stripe) which overlaps with the first modulator arm 126 of the optical waveguide 120. The heater 130 further includes pad portions 134a, 134b, 134c, 134d and tapered portions 136a, 136b, 136c, 136d, wherein the pad portions 134a, 134b, 134c, 134d are disposed aside of the heating portion 132, the conductive contacts 150 land on and are electrically connected to the pad portions 134a, 134b, 134c, 134d. The tapered portion 136a includes a first end 136a1 connecting to the pad portion 134a and a second end 136a2 opposite to the first end 136a1, and the first end 136a1 is wider than the second end 136a2; the tapered portion 136b includes a first end 136b1 connecting to the pad portion 134b and a second end 136b2 opposite to the first end 136b1, and the first end 136b1 is wider than the second end 136b2; the tapered portion 136c includes a first end 136d connecting to the pad portion 134c and a second end 136c2 opposite to the first end 136c1, and the first end 136c1 is wider than the second end 136c2; and the tapered portion 136d includes a first end 136d1 connecting to the pad portion 134d and a second end 136d2 opposite to the first end 136d1, and the first end 136d1 is wider than the second end 136d2. Furthermore, in some embodiments, the heater 130 further includes necking portions 138a, 138b, 138c and 138d, wherein the necking portion 138a connects the second end 136a2 of the tapered portion 136a to the heating portion 132; the necking portion 138b connects the second end 136b2 of the tapered portion 136b to the heating portion 132; the necking portion 138c connects the second end 136c2 of the tapered portion 136c to the heating portion 132; and the necking portion 138d connects the second end 136d2 of the tapered portion 136d to the heating portion 132. The heating portion 132 is divided into three segments 132A, 132B and 132C because of four pad portions 134a, 134b, 134c, 134d are connected to the heating portion 132 of the heater 130. Through properly applying bias on pad portions 134a, 134b, 134c and 134d, the segments 132A, 132B and 132C of the heating portion 132 may be individually controlled to heat different portions of the optical waveguide 120 and modulate the optical phase of the optical waveguide 120. In some embodiments, the segment 132C of the heating portion 132 can generate heat when the pad portions 134a, 134b and 134c are connected to a high voltage (e.g., 2 volts) and the pad portion 134d is connected to a low voltage (e.g., grounded). In some other embodiments, the segments 132A and 132C of the heating portion 132 can generate heat when the pad portions 134b and 134c are connected to a high voltage (e.g., 2 volts) and the pad portions 134a and 134d are connected to a low voltage (e.g., grounded).

In the above-mentioned embodiments, the tapered portions 136a, 136b, 136c, 136d and necking portions 138a, 138b, 138c and 138d constitute current confinement portions.

In FIG. 3, the width A of the heating portion 132 may range from about 0.1 micrometer to about 10 micrometers, and preferably, the width A of the heating portion 132 may be greater than or substantially equal to 1 micrometer; the distance D between the conductive contacts 150 and the heating portion 132 may range from about 0.1 micrometer to about 100 micrometers, and preferably, the distance D between the conductive contacts 150 and the heating portion 132 may be greater than or substantially equal to 10 micrometers; the minimum distance E between the conductive contacts 150 and the outer profile of the pad portions 134a, 134b, 134c, 134d may range from about 0.1 micrometer to about 100 micrometers, and preferably, the minimum distance E between the conductive contacts 150 and the outer profile of the pad portions 134a, 134b, 134c, 134d may be greater than or substantially equal to 0.4 micrometer; the width F of the heating portion 132 may range from about 100 nanometers to about 20 micrometers, and preferably, the width F of the pad portions 134a, 134b, 134c, 134d may be greater than or substantially equal to 1 micrometer; the height G of the tapered portions 136a, 136b, 136c, 136d may range from about 100 nanometers to about 20 micrometers, and preferably, the height G of the tapered portions 136a, 136b, 136c, 136d may be greater than or substantially equal to 1 micrometer; the height H of the necking portions 138a, 138b, 138c, 138d may range from about 100 nanometers to about 20 micrometers, and preferably, the height H of the necking portions 138a, 138b, 138c, 138d may be greater than or substantially equal to 0.5 micrometer; and the width I of the necking portions 138a, 138b, 138c, 138d may range from about 100 nanometers to about 20 micrometers, and preferably, the width I of the necking portions 138a, 138b, 138c, 138d may be greater than or substantially equal to 4 micrometers.

Figure 4:
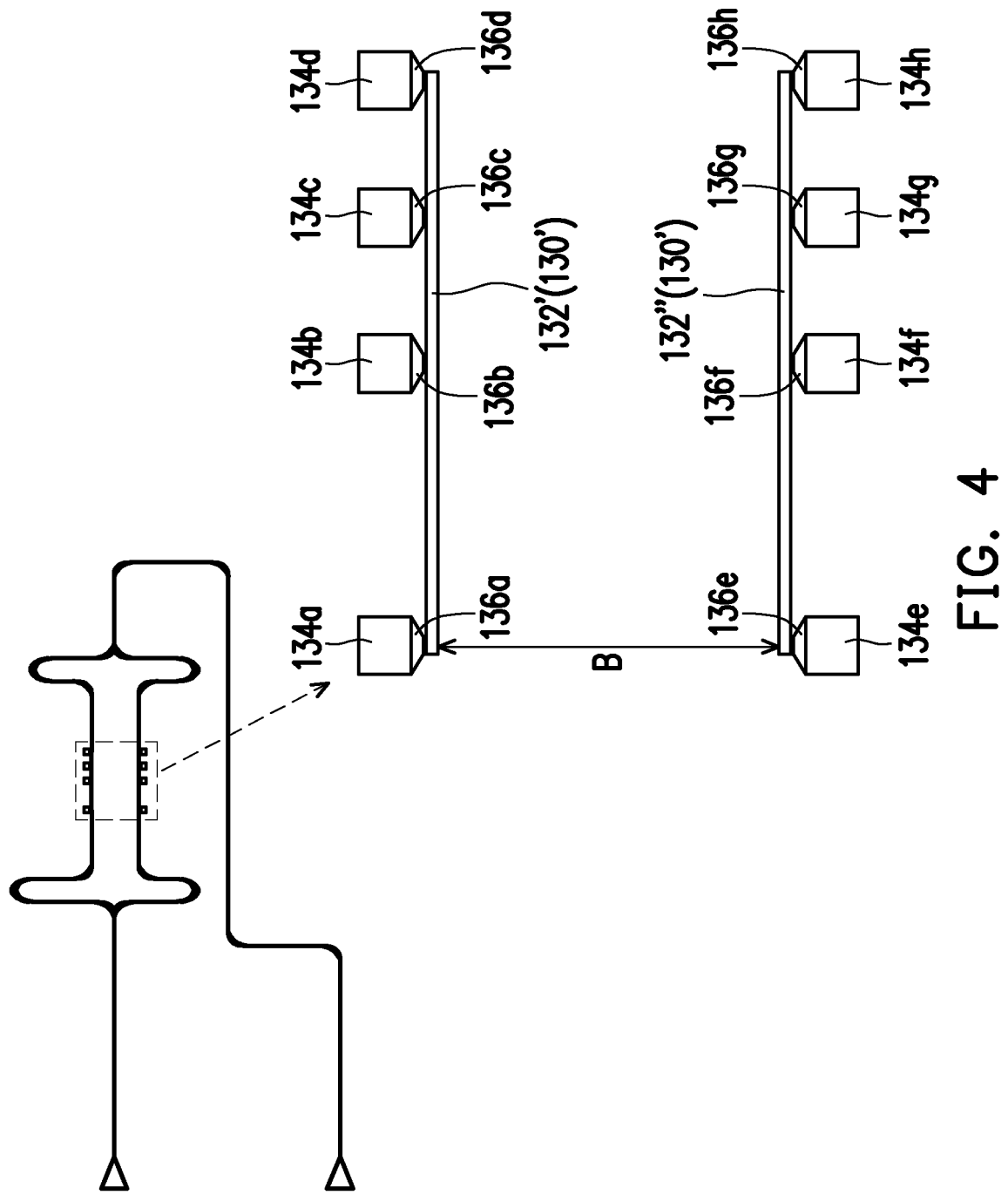

Referring to FIG. 2 and FIG. 4, the thermally tunable waveguide illustrated in FIG. 4 is similar with the thermally tunable waveguide illustrated in FIG. 2 except that the design of the heater 130'. As illustrated in FIG. 4, the heater 130' includes a first heating portion 132' and a second heating portion 132". In the present embodiment, both the first modulator arm 126 and the second modulator arm 128 are PN junction-based phase shifters. The PN junction-based phase shifters in the first modulator arm 126 and the second modulator arm 128 may include an interleaved PN junction, a lateral PN junction, or a vertical PN junction. The first heating portion 132' overlaps with a portion (i.e., phase shifter) of the first modulator arm 126, and the second heating portion 132" overlaps with a portion (i.e., phase shifter) of the second modulator arm 128. The first heating portion 132' is connected to first pad portion 134a through the first tapered portions 134a, the first heating portion 132' is connected to first pad portion 134b through the first tapered portions 134b, the first heating portion 132' is connected to first pad portion 134c through the first tapered portions 134c, and the first heating portion 132' is connected to first pad portion 134d through the first tapered portions 134d. Furthermore, the second heating portion 132" is connected to second pad portions 134e through the second tapered portions 134e, the second heating portion 132" is connected to second pad portions 134f through the second tapered portions 134f, the second heating portion 132" is connected to second pad portions 134g through the second tapered portions 134g, and the second heating portion 132" is connected to second pad portions 134h through the second tapered portions 134h. In some embodiments, the distance B between the first heating portion 132' and the second heating portion 132" ranges from about 0.1 micrometer to about 100 micrometers, and preferably, the distance B between the first heating portion 132' and the second heating portion 132" may be greater than or substantially equal to 1.5 micrometers.

As illustrated in FIG. 4, the first heating portion 132' of the heater 130' is not directly connected to the second heating portion 132" of the heater 130', and the first heating portion 132' and the second heating portion 132" of the heater 130' may be controlled individually. Accordingly, heating efficiency of the heater 130', controllability of the heater 130' as well as modulation flexibility of the thermally tunable waveguide illustrated in FIG. 4 can be significantly enhanced.

Figure 5:
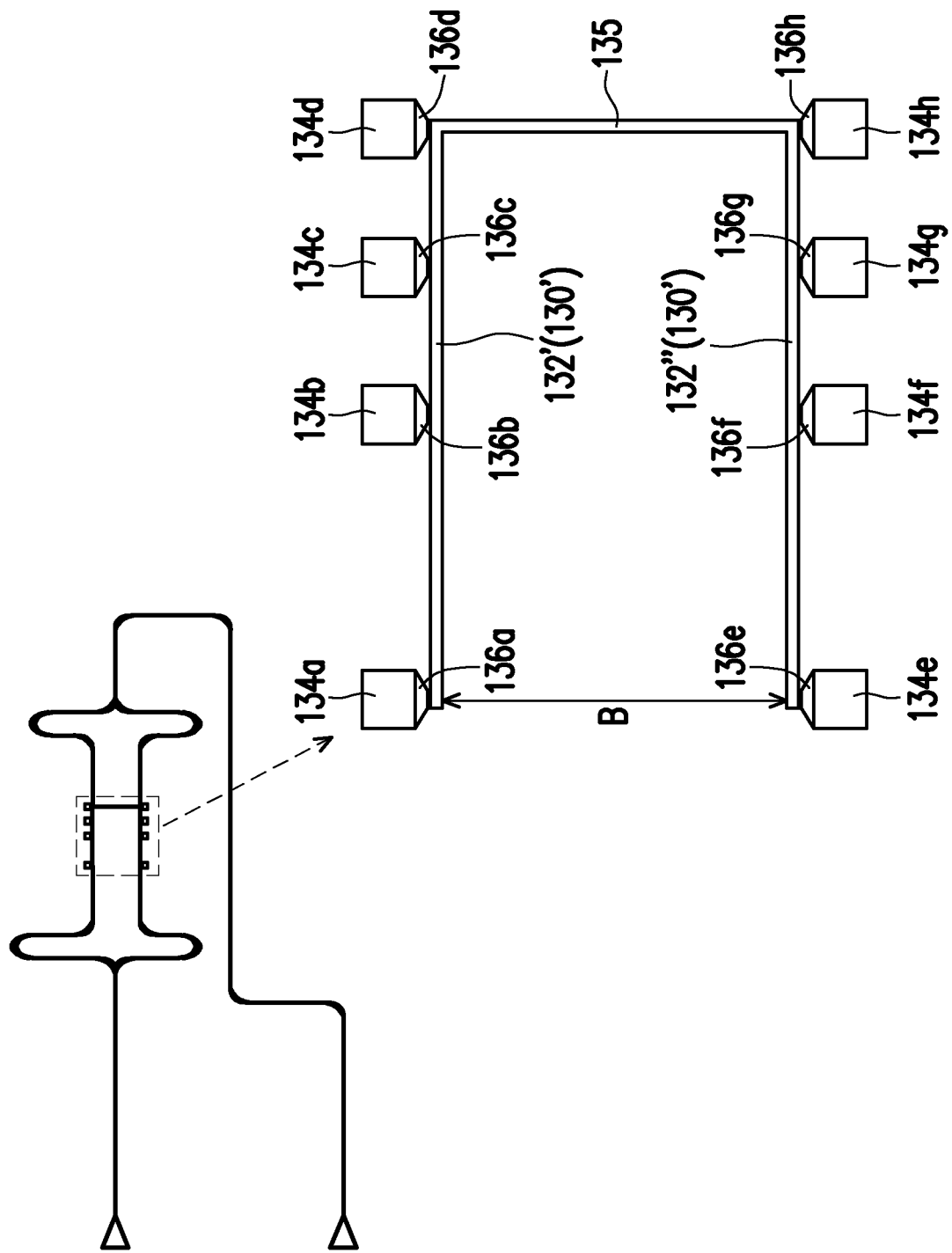

Referring to FIG. 4 and FIG. 5, the thermally tunable waveguide illustrated in FIG. 5 is similar with the thermally tunable waveguide illustrated in FIG. 4 except that the first heating portion 132' and the second heating portion 132" are connected to each other through a bridge line 135. In some embodiments, the length (i.e., the distance B between the first heating portion 132' and the second heating portion 132") of the bridge line 135 ranges from about 0.1 micrometer to about 100 micrometers, and preferably, the length of the bridge line 135 may be greater than or substantially equal to 1.5 micrometers.

Figure 6:
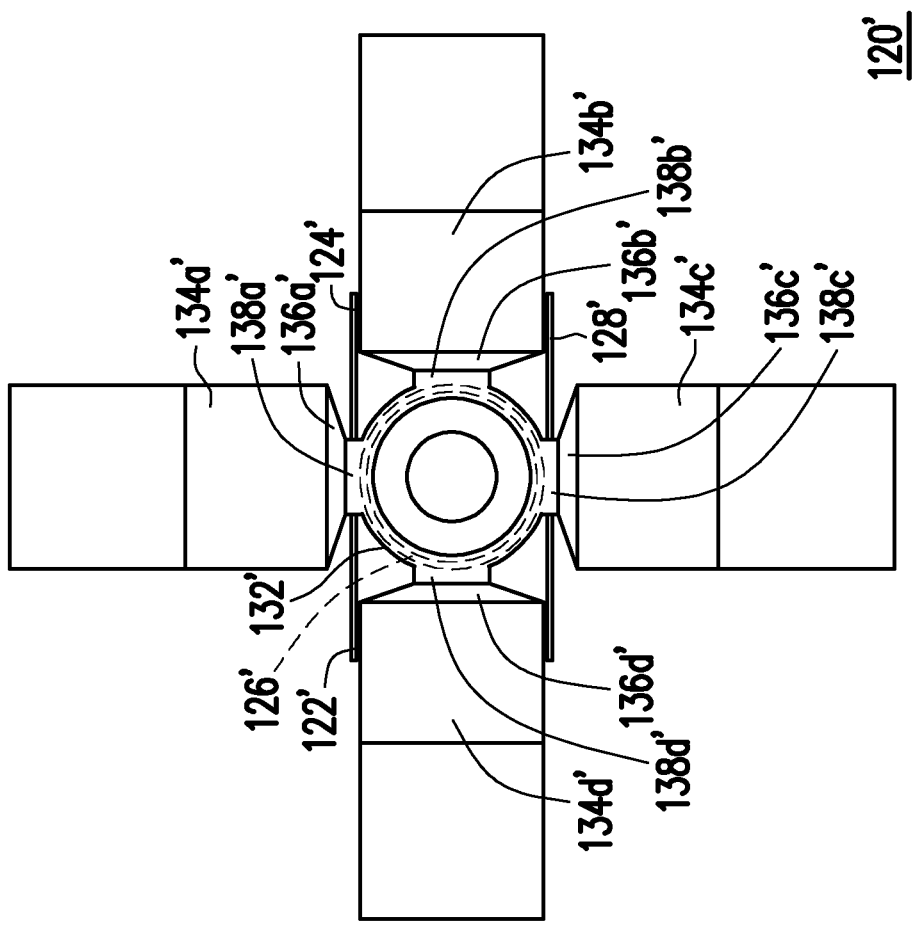
Figure 7:
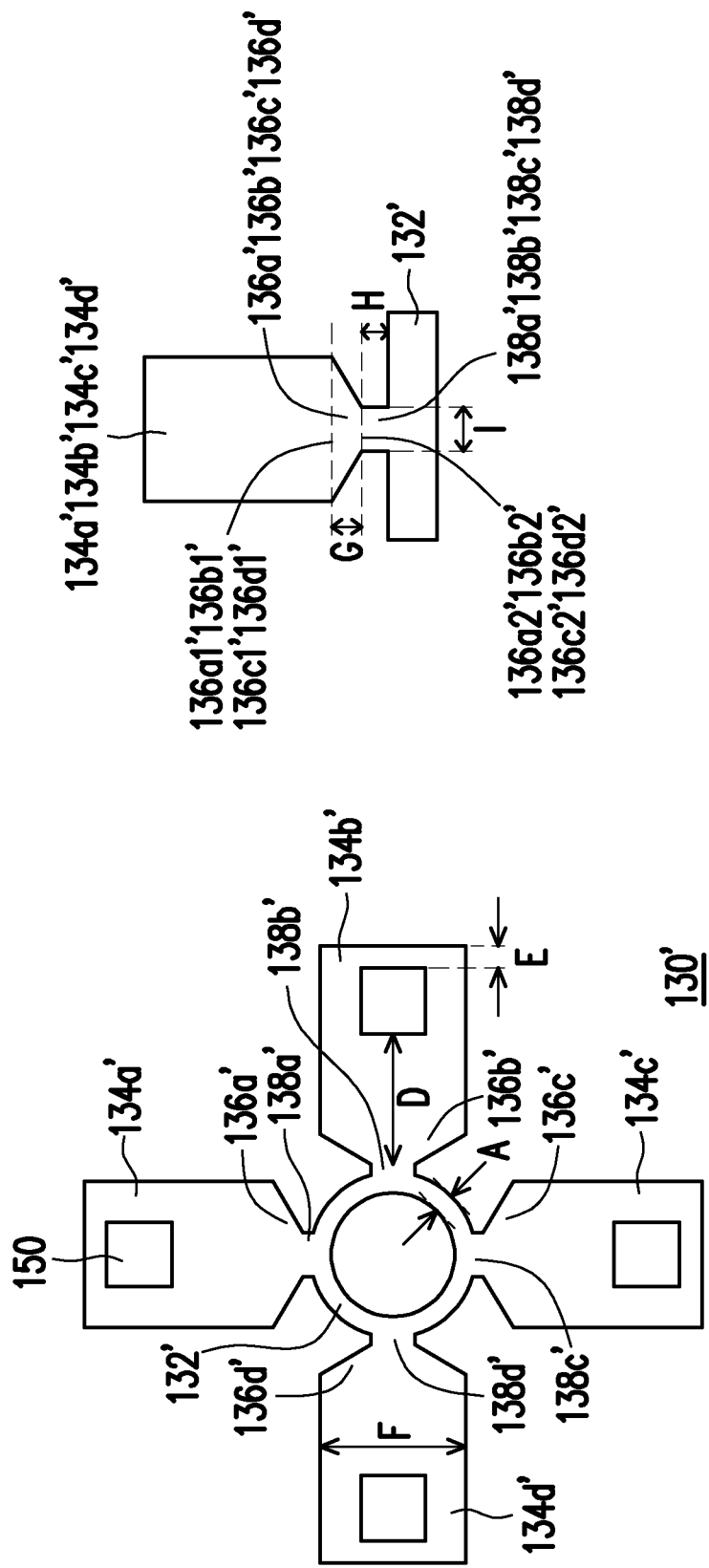

Referring to FIG. 6, in the present embodiment, the optical waveguide 120' includes a Micro-ring Resonator Modulator (MRM). The Micro-ring Resonator Modulator includes an optical input end 122', an optical output end 124', and a micro-ring portion 126' and the heating portion 132' includes a ring-shaped heating portion covering the micro-ring portion 126'. In some embodiments, the micro-ring portion includes a PN junction-based phase shifter. In addition, the Micro-ring Resonator Modulator may further include a drop end 128'. The drop end 128' functions as a sensing part of feedback loop, and the drop end 128' is coupled to the micro-ring portion 126' to provide a port for monitoring the optical power level inside the modulator.

As illustrated in FIG. 6, in some embodiments, the micro-ring portion 126' includes a PN junction-based phase shifter, and a ring-shaped heating portion 132' of the heater 130' overlaps with the micro-ring portion 126'. For example, the PN junction-based phase shifter in the micro-ring portion 126' includes an interleaved PN junction, a lateral PN junction, or a vertical PN junction. High-speed phase modulation may be achieved with depletion-mode PN junctions. Within PN junctions, the number of excess electrons and holes strongly dictate the refractive index and absorption coefficient. Combined with the applied voltage across the junction, these factors affect the maximum phase shift as well as the loss. Device parameters for phase shifters include intrinsic index and absorption, junction geometries and doping concentrations. The heater 130' heats the micro-ring portion 126' such that phase of the optical signal propagated in the micro-ring portion 126' may modulated. For example, the phase or wavelength of the optical signal propagated in the micro-ring portion 126' may be modulated from 1312 nm to 1322 nm when the heater 130 is implemented to heat the micro-ring portion 126'. Large wavelength/phase shift (e.g., about 10 nm wavelength/phase shift) can be obtained.

Referring to FIG. 6 and FIG. 7, the heater 130' includes a heating portion 132' (e.g., a heating ring) which overlaps with the micro-ring portion 126' of the optical waveguide 120'. The heater 130' further includes pad portions 134a', 134b', 134c', 134d' and tapered portions 136a', 136b', 136c', 136d', wherein the pad portions 134a', 134b', 134c', 134d' are disposed aside of the heating portion 132', the conductive contacts 150 land on and are electrically connected to the pad portions 134a', 134b', 134c', 134d'. The tapered portion 136a' includes a first end 136a1' connecting to the pad portion 134a' and a second end 136a2' opposite to the first end 136a1', and the first end 136a1' is wider than the second end 136a2'; the tapered portion 136b' includes a first end 136b1' connecting to the pad portion 134b' and a second end 136b2' opposite to the first end 136b1', and the first end 136b1' is wider than the second end 136b2'; the tapered portion 136c' includes a first end 136c1' connecting to the pad portion 134c' and a second end 136c2' opposite to the first end 136c1', and the first end 136c1' is wider than the second end 136c2'; and the tapered portion 136d' includes a first end 136d1' connecting to the pad portion 134d' and a second end 136d2' opposite to the first end 136d1', and the first end 136d1' is wider than the second end 136d2'. Furthermore, in some embodiments, the heater 130' further includes necking portions 138a', 138b', 138c' and 138d', wherein the necking portion 138a' connects the second end 136a2' of the tapered portion 136a' to the heating portion 132'; the necking portion 138b' connects the second end 136b2' of the tapered portion 136b' to the heating portion 132'; the necking portion 138c' connects the second end 136c2' of the tapered portion 136c' to the heating portion 132'; and the necking portion 138d' connects the second end 136d2' of the tapered portion 136d' to the heating portion 132'. The ring-shaped heating portion 132' is divided into multiple segments because of four pad portions 134a', 134b', 134c', 134d' are connected to the heating portion 132' of the heater 130'. Through properly applying bias on pad portions 134a', 134b', 134c' and 134d', the segments of the heating portion 132' may be individually controlled to heat different portions of the optical waveguide 120' and modulate the optical phase of the optical waveguide 120'. In some embodiments, an upper segment of the heating portion 132' can generate heat when the pad portions 134b', 134c' and 134d' are connected to a high voltage (e.g., 2 volts) and the pad portion 134a' is connected to a low voltage (e.g., grounded). In some other embodiments, a lower segment of the heating portion 132' can generate heat when the pad portions 134a', 134b' and 134d' are connected to a high voltage (e.g., 2 volts) and the pad portion 134c' is connected to a low voltage (e.g., grounded). In yet another embodiment, all segments of the heating portion 132' can generate heat when the pad portions 134b' and 134d' are connected to a high voltage (e.g., 2 volts) and the pad portion 134a' and 134c' are connected to a low voltage (e.g., grounded). In still yet another embodiment, all segments of the heating portion 132' can generate heat when the pad portions 134a' and 134c' are connected to a high voltage (e.g., 2 volts) and the pad portion 134b' and 134d' are connected to a low voltage (e.g., grounded).

In FIG. 7, the width A of the heating portion 132' may range from about 0.1 micrometer to about 10 micrometers, and preferably, the width A of the heating portion 132' may be greater than or substantially equal to 1 micrometer; the distance D between the conductive contacts 150 and the heating portion 132' may range from about 0.1 micrometer to about 100 micrometers, and preferably, the distance D between the conductive contacts 150 and the heating portion 132' may be greater than or substantially equal to 10 micrometers; the minimum distance E between the conductive contacts 150 and the outer profile of the pad portions 134a', 134b', 134c', 134d' may range from about 0.1 micrometer to about 100 micrometers, and preferably, the minimum distance E between the conductive contacts 150 and the outer profile of the pad portions 134a', 134b', 134c', 134d' may be greater than or substantially equal to 0.4 micrometer; the width F of the heating portion 132' may range from about 100 nanometers to about 20 micrometers, and preferably, the width F of the pad portions 134a', 134b', 134c', 134d' may be greater than or substantially equal to 1 micrometer; the height G of the tapered portions 136a', 136b', 136c', 136d' may range from about 100 nanometers to about 20 micrometers, and preferably, the height G of the tapered portions 136a', 136b', 136c', 136d' may be greater than or substantially equal to 1 micrometer; the height H of the necking portions 138a', 138b', 138c', 138d' may range from about 100 nanometers to about 20 micrometers, and preferably, the height H of the necking portions 138a', 138b', 138c', 138d' may be greater than or substantially equal to 0.5 micrometer; and the width I of the necking portions 138a', 138b', 138c', 138d' may range from about 100 nanometers to about 20 micrometers, and preferably, the width I of the necking portions 138a', 138b', 138c', 138d' may be greater than or substantially equal to 4 micrometers.

In the above-mentioned embodiments, the heaters with tapered portion design can enhance the thermal efficiency. Accordingly, performance of the thermally tunable waveguide having can be improved.

In accordance with some embodiments of the disclosure, a thermally tunable waveguide including an optical waveguide and a heater is provided. The optical waveguide includes a phase shifter. The heater is disposed over the optical waveguide. The heater includes a heating portion, pad portions and tapered portions. The heating portion overlaps with the phase shifter of the optical waveguide. The pad portions are disposed aside of the heating portion. Each of the pad portions is connected to the heating portion through one of the tapered portions respectively. In some embodiments, the optical waveguide includes a Mach-Zehnder Modulator (MZM). In some embodiments, the Mach-Zehnder Modulator includes an optical input end, an optical output end, a first modulator arm and a second modulator arm, an optical signal propagated from the optical input end to the optical output end is split into the first modulator arm and the second modulator arm and recombined at the optical output end. In some embodiments, the first modulator arm and the second modulator arm include PN junction-based phase shifters. In some embodiments, the heating portion includes a first heating portion and a second heating portion, the first heating portion overlaps with the first modulator arm, and the second heating portion overlaps with the second modulator arm. In some embodiments, the first heating portion is connected to first pad portions among the pad potions through first tapered portions among the tapered portions, and the second heating portion is connected to second pad portions among the pad potions through second tapered portions among the tapered portions.

In some embodiments, the optical waveguide includes a Micro-ring Resonator Modulator (MRM). In some embodiments, the Micro-ring Resonator Modulator includes an optical input end, an optical output end, and a micro-ring portion and the heating portion includes a ring-shaped heating portion covering the micro-ring portion. In some embodiments, the micro-ring portion includes a PN junction-based phase shifter.

In accordance with some other embodiments of the disclosure, a photonic integrated circuit component including a semiconductor substrate, an optical waveguide, a heater, and an interconnect structure is provided. The optical waveguide is disposed over the semiconductor substrate. The heater is disposed over the optical waveguide, the heater includes a heating portion overlapping with the optical waveguide, pad portions disposed aside of the heating portion and tapered portions, wherein each of the tapered portions respectively includes a first end connecting to the pad portions and a second end opposite to the first end, and the first end is wider than the second end. The interconnect structure is disposed over the optical waveguide and the heater, and the heater is between the interconnect structure and the optical waveguide. In some embodiments, the semiconductor substrate includes a bulk substrate and a buried insulating layer covering the bulk substrate, and the optical waveguide is disposed on the buried insulating layer. In some embodiments, the photonic integrated circuit component further includes an interlayer dielectric layer and conductive contacts, wherein the interlayer dielectric layer covers the optical waveguide and the heater, the conductive contacts are embedded in the interlayer dielectric layer, and the conductive contacts are electrically connected to the pad portions of the heater. In some embodiments, a distance between the heater and the optical waveguide ranges from about 320 nanometers to about 3180 nanometers. In some embodiments, the resistance of the heating portion is about 30 ohm per square. In some embodiments, the material of the heater includes aluminum (Al), copper (Cu), ruthenium (Ru), manganese (Mn), titanium (Ti), titanium nitride (TiN) or silicon nitride (SiN). In some embodiments, the heater further includes necking portions connecting the second ends of the tapered portions to the heating portion. In some embodiments, the optical waveguide includes a PN junction-based phase shifter having interleaved PN junction, lateral PN junction, or vertical PN junction.

In accordance with some other embodiments of the disclosure, a thermally tunable waveguide including an optical waveguide and a heater is provided. The optical waveguide includes an optical input end, an optical output end and at least one phase shifter. The heater is disposed over the at least one phase shifter. The heater includes a heating portion, pad portions, and current confinement portions. The heating portion overlaps with the at least one phase shifter of the optical waveguide. The pad portions are disposed aside of the heating portion. Each of the pad portions is connected to the heating portion through one of the current confinement portions respectively. In some embodiments, the first width of the pad portions is greater than the second width of the current confinement portions. In some embodiments, each of the current confinement portions includes a first end connecting to one of the pad portions and a second end connecting to the heating portion, and the first end is wider than the second end.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A thermally tunable waveguide, comprising:
   an optical waveguide;
   a heater disposed over the optical waveguide, the heater comprising:
      a heating portion overlapping with a portion of the optical waveguide;
      pad portions disposed aside of the heating portion; and
      connecting portions, each of the connecting portions comprises a first end and a second end opposite to the first end, the first end is connected to one of the pad portions, the second end is connected to the heating portion, and the first end is wider than the second end.

2. The thermally tunable waveguide of claim 1, wherein the optical waveguide comprises a Mach-Zehnder Modulator (MZM).

3. The thermally tunable waveguide of claim 2, wherein the Mach-Zehnder Modulator comprises an optical input end, an optical output end, a first modulator arm and a second modulator arm, an optical signal propagated from the optical input end to the optical output end is split into the first modulator arm and the second modulator arm and recombined at the optical output end.

4. The thermally tunable waveguide of claim 3, wherein the first modulator arm and the second modulator arm comprise PN junction-based phase shifters.

5. The thermally tunable waveguide of claim 3, wherein the heating portion comprises a first heating portion and a second heating portion, the first heating portion overlaps with the first modulator arm, and the second heating portion overlaps with the second modulator arm.

6. The thermally tunable waveguide of claim 5, wherein the first heating portion is connected to first pad portions among the pad potions through first connecting portions among the connecting portions, and the second heating portion is connected to second pad portions among the pad potions through second connecting portions among the connecting portions.

7. The thermally tunable waveguide of claim 1, wherein the optical waveguide comprises a Micro-ring Resonator Modulator (MRM).

8. The thermally tunable waveguide of claim 7, wherein the Micro-ring Resonator Modulator comprises an optical input end, an optical output end and a micro-ring portion, and the heating portion comprises a ring-shaped heating portion covering the micro-ring portion.

9. The thermally tunable waveguide of claim 7, wherein the micro-ring portion comprises a PN junction-based phase shifter.

10. A photonic integrated circuit component, comprising:
    a semiconductor substrate;
    an optical waveguide disposed over the semiconductor substrate, the optical waveguide comprising at least one thermally tunable portion;
    a heater disposed over the at least one thermally tunable portion of the optical waveguide, the heater comprising
       a heating portion overlapping with the optical waveguide, a pad portion disposed aside of the heating portion and a tapered portion connected between the pad portion and the heating portion;

an interlayer dielectric layer covering the optical waveguide and the heater; and conductive contacts embedded in the interlayer dielectric layer and electrically connected to the pad portion of the heater.

11. The photonic integrated circuit component of claim 10, wherein the semiconductor substrate comprises a bulk substrate and a buried insulating layer covering the bulk substrate, and the optical waveguide is disposed on the buried insulating layer.

12. The photonic integrated circuit component of claim 10, wherein a first end of the tapered portion is connected to the pad portion.

13. The photonic integrated circuit component of claim 10, wherein a second end of the tapered portions is connected to the heating portion.

14. The photonic integrated circuit component of claim 13, wherein the heater further comprises a necking portion connected between the second end of the tapered portion and the heating portion.

15. The photonic integrated circuit component of claim 14, wherein a width of the necking portion is narrower than a width of the first end of the tapered portion.

16. The photonic integrated circuit component of claim 10, wherein the at least one thermally tunable portion comprises a PN junction-based phase shifter.

17. The photonic integrated circuit component of claim 16, wherein the PN junction-based phase shifter comprises an interleaved PN junction, a lateral PN junction, and/or a vertical PN junction.

18. A thermally tunable waveguide, comprising:

an optical waveguide comprising an optical input end, an optical output end and at least one thermally tunable portion between the optical input end and the optical output end; and a heater disposed over the at least one thermally tunable portion, and the heater comprising:

a heating portion overlapping with the at least one phase shifter of the optical waveguide;

a confinement portion extending from the heating portion; and a pad portion connected to the confinement portion.

19. The thermally tunable waveguide of claim 18, wherein a width of the pad portion is greater than a minimum width of the confinement portion.

20. The thermally tunable waveguide of claim 18, wherein the confinement portion comprises a tapered portion and a necking portion, the tapered portion is connected between the pad portion and the necking portion, and the necking portion is connected between the taper portion and the heating portion.

* * * * *